United States Patent [19]

Fukuta

[11] Patent Number: 5,446,601

[45] Date of Patent: Aug. 29, 1995

[54] READ/WRITE CIRCUIT FOR MINIMIZING RECOVERY TIME

[75] Inventor: Masaru Fukuta, Fujisawa, Japan

[73] Assignee: International Business Machines Corporation, Armonk, N.Y.

[21] Appl. No.: 207,010

[22] Filed: Mar. 7, 1994

[30] Foreign Application Priority Data

Mar. 8, 1993 [JP] Japan .................................. 5-046968

[51] Int. Cl.$^6$ .................................................. G11B 5/09
[52] U.S. Cl. ......................................... 360/46; 360/64
[58] Field of Search ................. 360/46, 64, 62, 67, 360/68, 51, 48, 65

[56] References Cited

U.S. PATENT DOCUMENTS

| | | | |
|---|---|---|---|
| 4,805,047 | 2/1989 | Nasu et al. ................... | 360/46 X |
| 4,821,127 | 4/1989 | Soga et al. ..................... | 360/67 X |
| 4,868,691 | 9/1989 | Kawasaki ......................... | 360/68 |
| 4,882,639 | 11/1989 | Nasu et al. ................... | 360/46 X |
| 4,956,729 | 9/1990 | Yatsugi et al. .................. | 360/67 |
| 5,168,395 | 12/1992 | Klaassen et al. ................. | 360/46 |

Primary Examiner—Donald T. Hajec
Assistant Examiner—Thien Minh Le
Attorney, Agent, or Firm—Richard E. Billion

[57] ABSTRACT

To provide a R/W circuit in which the output of an AGC is not shifted even if the output of a R/W amplifier irregularly varies during a transition time so that the detector output is not delayed. Means are provided for setting the output of a R/W amplifier 12 to a high impedance state for a predetermined time after the operation of a magnetic recording apparatus is switched from writing to reading, which comprise switches 20 and 22 connected to the outputs of the R/W amplifier 12 and an output control circuit 24 for controlling opening and closing of the switches. The output control circuit 24 opens the switches 20 and 22 for a predetermined time after switching to reading so that the irregular output of the amplifier 12 does not influence succeeding circuits.

16 Claims, 4 Drawing Sheets

READ/WRITE CIRCUIT FOR MINIMIZING RECOVERY TIME

FIELD OF THE INVENTION

The present invention relates to a read/write circuit for a magnetic recording apparatus, and more particularly to a read/write circuit having a reduced recovery time at the time of switching from a write operation to a read operation.

BACKGROUND OF THE INVENTION

As shown in FIG. 1, a read/write (hereinafter referred to as R/W) circuit in a magnetic recording apparatus generally includes a R/W amplifier 12 connected to a head 10, an automatic gain control circuit (AGC) 14 connected to the differential outputs of the amplifier 12 through coupling capacitors C1 and C2, and a detector 16 for separately extracting data and servo signals from the output of the AGC 14. For reading, a signal read by the head 10 is amplified by the R/W amplifier 12 and then provided to the detector 16 through the capacitors C1 and C2, and the AGC 14. For writing, a write current is provided to the head 10 through a write amplifier (not shown) connected in parallel with the R/W amplifier 12. As is well known in the art, a servo signal from the detector 16 is used for positioning the head 10, and a data signal is provided to a digital processing circuit (not shown) such as a microprocessor.

In the above R/W circuit, it is known that there is a problem of DC offset at the output of the amplifier 12. That is, since DC levels at the output of the amplifier 12 on reading and writing differ from each other, a little time (this is called recovery time) is required for starting normal reading when the operation is switched from writing to reading. Various solutions have been proposed to reduce the recovery time so as to realize shorter access time and higher recording density in the magnetic recording apparatus, especially high speed hard disk drive (HDD).

For example, IBM Technical Disclosure Bulletin, Vol. 26, No. 4, Sep. 1983, pp. 2100 to 2103 describes a DC offset correction in which a fast DC restore loop including an integrator and two comparators is connected to one of the differential outputs of an AGC (corresponding to element 14 in FIG. 1), and the loop senses a new offset at the time of switching from writing to reading and rapidly adjusts an offset voltage at the time of previous writing. Further, Japanese Published Unexamined Patent Application 61-63966 discloses a circuit for shortening the recovery time in which the differential inputs of an AGC are short-circuited for a certain period of time at the time of switching from writing to reading.

As described above, the problem of delay in the recovery time due to a DC offset has been solved in some degree and a R/W amplifier such as HA166134LT manufactured by Hitachi, Ltd., which does not practically present a DC offset problem, has also been developed. However, there is a different problem other than the DC offset in such a R/W amplifier for magnetic recording. The R/W amplifier has a limited transition time when the operation is switched from writing to reading during which its output is quite indefinite and may vary widely depending on the components of the amplifier. Such indefinite output charges the coupling capacitors C1 and C2 shown in FIG. 1 to thereby shift a read output after the transition time, as in the case of the DC offset. Since the amount of such shift cannot be predicted, it has been assumed to have a possible maximum value in consideration of the maximum variation in the amplifier.

FIG. 2 shows output waveforms of the R/W amplifier 12, the AGC 14, and the detector 16 at the time of switching from writing to reading. Since the amplitudes of the R/W amplifier output and the AGC output are small as compared with those of the detector output, the R/W amplifier output and the AGC output are scaled up approximately a hundred times and twenty five times as large as the detector output, respectively in FIG. 2 (and FIG. 6 described later). A R/W control signal indicates writing when it is high and reading when it is low. During a transition time T after the R/W control signal is switched from high to low, the output of the R/W amplifier 12 largely swings (a part of its waveform is omitted by dotted lines) and its peak value is ten or more times as large as a peak value of the waveform after the transition time. It is seen that this large and irregular swing causes a DC level shift in the AGC output immediately after the transition time (in the example of FIG. 2, it is shifted upward) so that the detector output is delayed by a time Td. The figure shows reading of a servo area positioned at the beginning of each sector in a magnetic recording apparatus of a sector servo type. If the detector output is delayed in such an apparatus, a sector ID recorded at the beginning of the servo area may not be exactly detected. There would be no problem in the detection if the ID could be recorded taking account of the delay which, however, reduces the recording density per track. Since magnetic recording apparatuses having larger capacities are required, it is not preferable to have the detector output delayed. Particularly, in the magnetic recording apparatus of the sector servo type, the servo area is read from each sector even in a write operation so that reading and writing are alternately repeated for each sector, which would be affected by the delay of the detector output more strongly than the magnetic recording apparatus of the dedicated servo type.

Accordingly, it is an object of the present invention to provide a R/W circuit for a magnetic recording apparatus in which the output of an AGC is not shifted even if the output of a R/W amplifier irregularly varies during a transition time so that the output of a detector is not delayed.

SUMMARY OF THE INVENTION

The present invention solves the above-mentioned problems by setting the output of a R/W amplifier to a high impedance state for a predetermined time after the operation is switched from writing to reading. This is accomplished, for example, by providing switching means between the output of the R/W amplifier and coupling capacitors and opening the switching means for the above predetermined period of time. When the switching means is opened, the output of the R/W amplifier is not charged in the coupling capacitors and, therefore, it is possible to start reading immediately after the switching means is closed if the switching means is kept opened until the output of the R/W amplifier is stabilized. A period of time during which the switching means is opened, that is, the output of the R/W amplifier remains the high impedance state should be determined in accordance with the nominal transition time of the R/W amplifier. Since the manufacturers generally announce a maximum time, there would be no problem if the time is set equal to or greater than the announced time.

DETAILED DESCRIPTION OF THE PREFERRED EMBODIMENTS

In the following, embodiments implementing the present invention in a hard disk drive (HDD) of a sector servo type will be described, but it is to be understood that the present invention may be implemented in any magnetic recording apparatus using a R/W amplifier having such transition time problem as described above.

Figure 1:
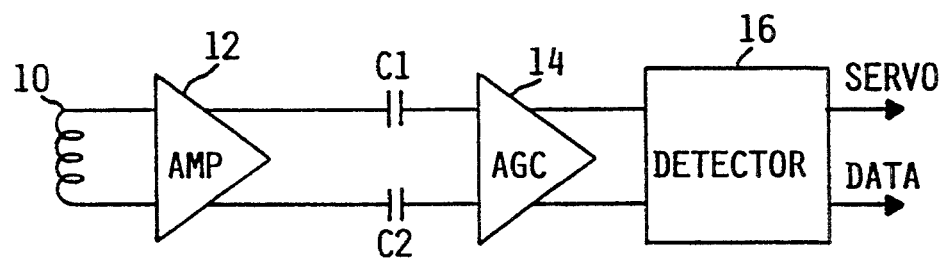
FIG. 1 is a circuit block diagram showing a conventional read/write circuit used for a magnetic recording apparatus.
Figure 3:
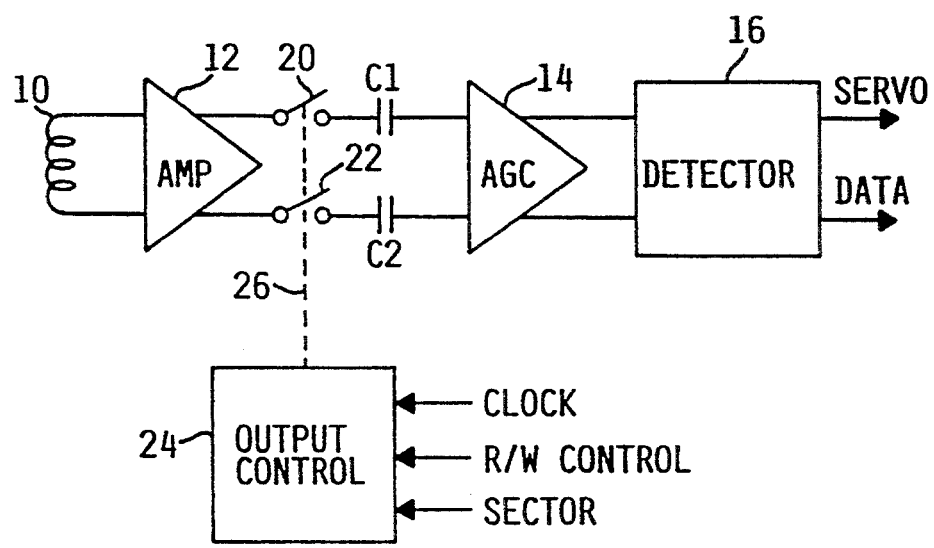
FIG. 3 is a circuit block diagram showing a read/write circuit according to the present invention.

The configuration of a R/W circuit according to the present invention is shown in FIG. 3. The same circuit components as those shown in FIG. 1 have the same reference numbers. In this embodiment, the R/W amplifier 12 is HA166134LT manufactured by Hitachi, which may neglect the above mentioned DC offset. However, the present invention may be implemented even with a R/W amplifier having a DC offset though it requires a certain measure as described in the Prior Art section in addition to the present invention.

In FIG. 3, two switches 20 and 22 connected between the differential outputs of the R/W amplifier 12 and coupling capacitors C1 and C2, respectively, and an output control circuit 24 for controlling opening and closing of these switches are circuit components provided according to the present invention. It is preferable that the switches 20 and 22 are semiconductor switches such as field effect transistors (FETs). The output control circuit 24 controls opening and closing of the switches 20 and 22, in response to a clock signal, a R/W control signal, and a sector pulse from a hard disk controller (HDC) not shown in the drawing. The HDC generates several clock signals by dividing a reference frequency signal from a crystal oscillator, generates a sector pulse indicating the start of a sector in accordance with a servo signal from the detector 16, and controls on/off of the R/W control signal based on a command from a host. Since such operations are well known in the art and do not directly relate to the present invention, the details thereof will not be described here. The output control circuit 24 opens the switches 20 and 22, under the control of these signals, for a predetermined period of time after the operation of the HDD is switched from writing to reading so that the indefinite output of the R/W amplifier 12 during the transition time is not accumulated in the capacitors C1 and C2. The period of time during which the switches 20 and 22 remain opened is set 17 equal to or greater than the nominal transition time of the R/W amplifier 12 (a maximum time of 1.5 microseconds in the case of HA166134LT).

Figure 4:
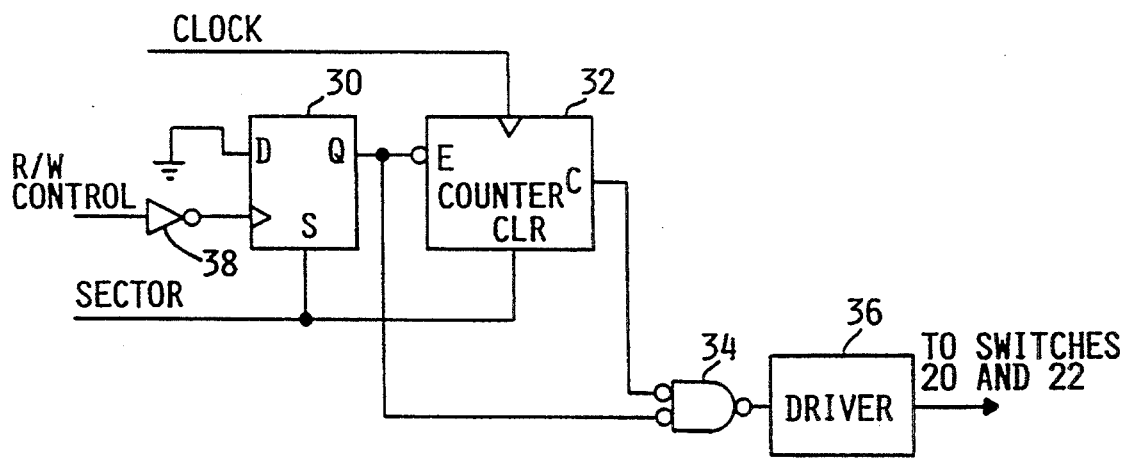
FIG. 4 is a circuit block diagram illustrating the configuration of an output control circuit.

The configuration of the output control circuit 24 for controlling the opening and closing of the switches 20 and 22 is shown in FIG. 4. The output control circuit 24 comprises a D flip-flop 30, a counter 32, a NAND gate 34, and a driver 36. The D flip-flop 30 is provided to detect that the operation was switched from writing to reading, and its data input terminal D is fixed to a low level and its clock input terminal receives a R/W control signal inverted by an inverter 38. A set terminal S of the D flip-flop 30 receives a sector pulse. Accordingly, the D flip-flop 30 is set each time a sector is started. A Q output of the D flip-flop 30 is connected to an inverted enable input terminal E of the counter 32.

The counter 32 is provided to set a period of time during which the switches 20 and 22 remain opened and starts to count clock pulses from the HDC when it is enabled by the Q output of the D flip-flop 30. The counter 32 may be the one which can detect that the count value has reached ft wherein f and t represent a frequency of the HDC clock and a time to be set, respectively. For example, if ft=4, a three-bit counter may be used to detect when its most significant bit becomes one. When the count reaches a predetermined value, the counter 32 sets its output C high and keeps that state until it is cleared. A clear terminal CLR of the counter 32 receives a sector pulse so that the counter 32 is cleared each time a sector is started. Two inverted inputs of the NAND gate 34 are connected to the output C of the counter 32 and the output Q of the D flip-flop 30, respectively. The output of the NAND gate 34 is provided, through the normal driver 36, to the switches 20 and 22, as indicated by a dotted line 26 in FIG. 3, so as to control their opening and closing. In the embodiment, the switches 20 and 22 are opened when the output of the NAND gate 34 becomes low, and are closed when the output becomes high.

Figure 5:
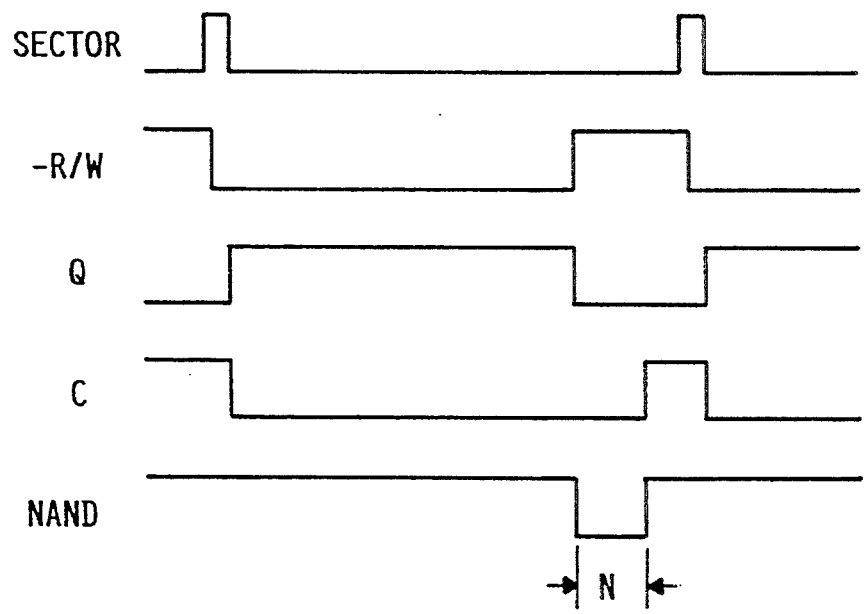
FIG. 5 is a timing chart for explaining the operations of the output control circuit.

The operations of the output control circuit 24 to be performed in the case where a plurality of sectors are continuously written are described below with reference to the timing chart of FIG. 5.

To write a sector, the HDC generates a sector pulse corresponding to the sector to set the flip-flop 30 and clear the counter 32, and sets a R/W control signal high. For convenience, FIG. 5 shows an inverted R/W control signal −R/W from the inverter 38. Since the Q output of the D flip-flop 30 becomes high, the output of the NAND gate 34 remains high. When the sector has been written, the HDC sets the R/W control signal low to read a servo area at the beginning of the next sector. This causes the clock input of the D flip-flop 30 to be high to thereby set the D flip-flop 30 to the state of its data input terminal D so that the Q output becomes low to enable the counter 32. The counter 32, thereby, starts counting the HDC clock pulses. Since the output C of the counter 32 remains low at that time, the NAND gate 34 is conditioned to provide a low output when the Q output becomes low. This low output is provided, through the driver 36, to the switches 20 and 22 to open them.

When the clock count value reaches a predetermined value N, the counter 32 sets its output C high and keeps its state. This causes the output of the NAND gate 34 to be high again to close the switches 20 and 22 through the driver 36. In the embodiment, the counter 32 sets its output high when it counts a 2.25 MHz clock generated as a servo clock in the HDC up to 4. A period of time, thus obtained, during which the switches remain opened is approximately 1.8 microseconds which is a little longer than 1.5 microseconds, the nominal transition time of the R/W amplifier 12. Practically, it will be sufficient to supply an appropriate one of a plurality of clocks generated in the HDC to the counter 32 and to select a count value N so that its frequency multiplied by N is equal to or greater than the nominal transition time.

After reading the servo area, the HDC generates the next sector pulse and sets the R/W control signal high for writing to the next sector. This causes the D flip-flop 30 to be set again with the output Q becoming high, and the counter 32 to be cleared with the output C becoming low. Thereafter similar operations are repeated for each sector until the requested writing is completed. If writing of a sector is followed by reading of another sector, the R/W control signal remains low even after the servo area of the latter sector is read.

ADVANTAGES OF THE INVENTION

Figure 2:
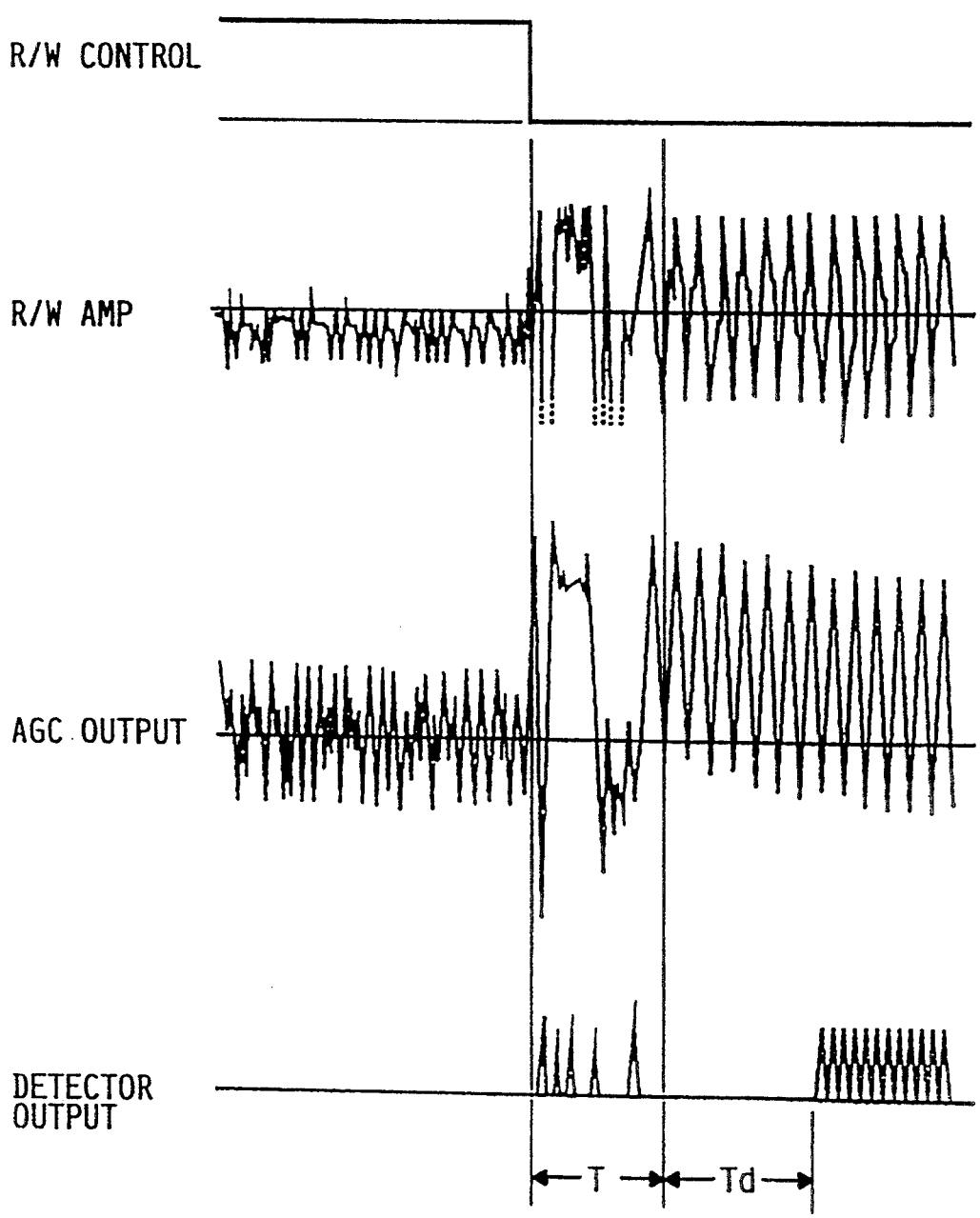
FIG. 2 shows output waveforms of a R/W amplifier, an AGC, and a detector in the conventional read/write circuit.
Figure 6:
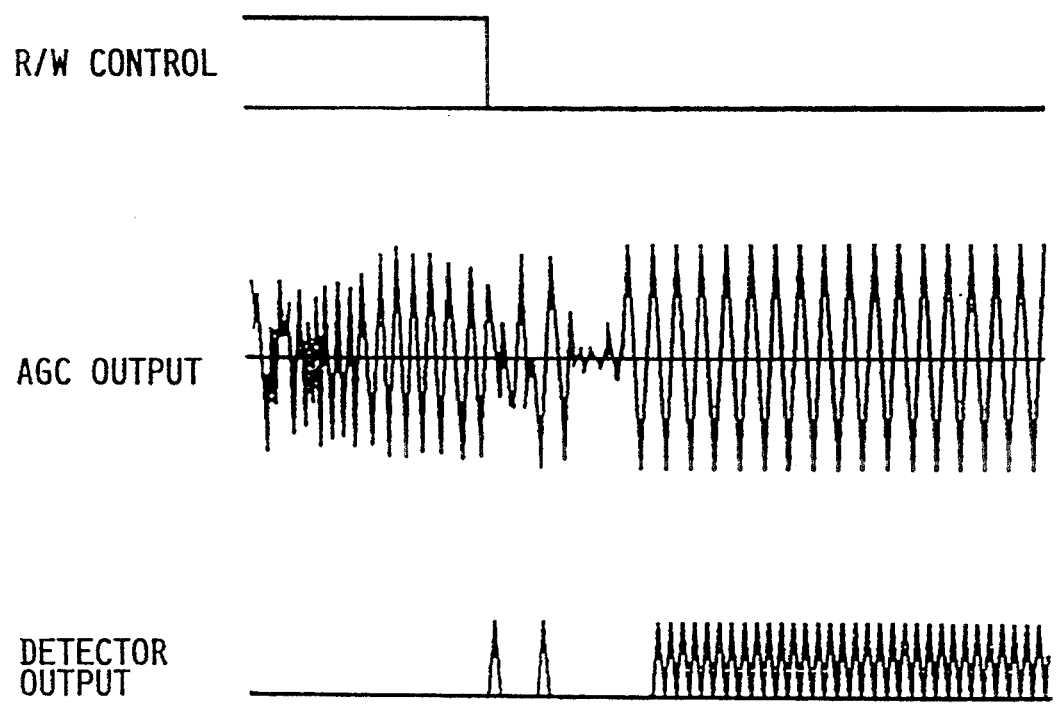
FIG. 6 shows output waveforms of the AGC and the detector, and a switch control signal from the output control circuit in the read/write circuit according to the present invention.

FIG. 6 shows the output waveforms of the AGC 14 and the detector 16 in the R/W circuit according to the present invention. As seen, the DC level shift is not caused in the output of the AGC 14 after the operation is switched from writing to reading and, therefore, the detector 16 generates output in a short time after the switching as compared with the case of FIG. 2. In FIG. 6, pulses appear in the output of the detector 16 immediately after switching to reading, which is due to the fact that the output amplitude of the R/W amplifier 12 is too large during the transition time and influences the input of the AGC 14 even if the switches 20 and 22 are turned off (this situation occurs since the switches 20 and 22 are semiconductor switches in the embodiment). As described above, according to the present invention, even if the output of the R/W amplifier irregularly varies during the transition time, the output of the AGC is not shifted and, therefore, the detector output is not delayed as opposed to the prior art.

What is claimed is:

1. A read/write circuit for a magnetic recording apparatus comprising:
   a head;
   an amplifier used during a read operation for amplifying a signal read by head;
   an automatic gain control circuit for receiving the output of said amplifier used during a read operation;
   a coupling capacitor between each input and each output of said amplifier used during a read operation and between each input and each output of said automatic gain control circuit;
   a detector connected to the output of said automatic gain control circuit; and
   means for detecting that the operation is switched from writing to reading;
   means for making the output of said amplifier used during a read operation high impedance in response to said means for detecting that the operation is switched from writing to reading for a predetermined time after detection of switching between writing and reading.

2. The read/write circuit according to claim 1, wherein said means for making the output of said amplifier used during a read operation high impedance further comprises:
   switches connected between the output of said amplifier used during a read operation and the coupling capacitors; and
   control means for opening said switches for said predetermined time.

3. The read/write circuit according to claim 2, wherein said control means further comprises:
   counting means for setting said predetermined time;
   means for opening said switches in response to the output of said detection means; and
   means for closing said switches in response to the output of said counting means.

4. The read/write circuit according to claim 3, wherein said counting means counts clock pulses generated by said magnetic recording apparatus and causes said switching means to close said switches when the count value reaches a predetermined number.

5. The read/write circuit according to claim 4, wherein said magnetic recording apparatus uses a sector servo system, and said detection means and said count means are initialized for each sector.

6. The read/write circuit according to claim 1, wherein the read/write amplifier nominal transition time over which the output of said amplifier used during a read operation stabilizes, said predetermined time is equal or greater than the nominal transition time.

7. A method for shortening the recovery time of a read/write circuit for a magnetic recording apparatus, the read/write circuit having a head, an amplifier used during a read operation for amplifying a signal read by the head, an automatic gain control circuit for receiving the output of the amplifier, coupling capacitors between each output of the amplifier used during a read operation and the input of the automatic gain control circuit, said method for shortening the recovery time which occurs between writing and reading operations of the read/write head comprising the steps of:
   detecting when the operation of the read/write circuit switches between writing and reading;
   switching the outputs of an amplifier used during a read operation to a high impedance state in response to detecting when the operation of the read/write circuit switches between writing and reading; and
   maintaining the outputs of the amplifier used during a read operation in a high impedance state for a selected amount of time.

8. The method for shortening the recovery time which occurs between writing and reading operations of the read/write head of claim 7 wherein the step of maintaining the outputs of the amplifier used during a read operation in a high impedance state for a selected amount of time includes counting clock cycles from a clock generated by timing marks from the medium of a disk drive.

9. The method for shortening the recovery time which occurs between writing and reading operations of the read/write head of claim 7 wherein the magnetic recording apparatus uses a sector servo and wherein the steps of detecting, switching, and maintaining occur after each sector servo.

10. The method for shortening the recovery time which occurs between writing and reading operations of the read/write head of claim 9 wherein the step of detecting when the operation of the read/write circuit switches between writing and reading is based on reading a signal generated by the magnetic recording apparatus.

11. A data storage device comprising:
a medium on which data is stored; and
a read/write circuit for writing data to or reading data from said medium on which data is stored, said read/write circuit further comprising:
a head;
an amplifier used during a read operation for amplifying a signal read by head;
an automatic gain control circuit for receiving the output of said amplifier used during a read operation;
a coupling capacitor between each input and each output of said amplifier used during a read operation and between each input and each output of said automatic gain control circuit;
a detector connected to the output of said automatic gain control circuit; and
means for making the output of said amplifier used during a read operation high impedance for a predetermined time after switching between writing and reading.

12. The data storage device according to claim 11, wherein said means for making the output of said amplifier used during a read operation high impedance further comprises:

switches connected between the output of said amplifier and the coupling capacitors; and
control means for opening said switches for said predetermined time.

13. The data storage device according to claim 12, wherein said control means further comprises:
means for detecting that the operation is switched from writing to reading;
counting means for setting said predetermined time;
means for opening said switches in response to the output of said detection means; and
means for closing said switches in response to the output of said counting means.

14. The data storage device according to claim 13, wherein said counting means counts clock pulses generated by said magnetic recording apparatus and causes said switching means to close said switches when the count value reaches a predetermined number.

15. The data storage device according to claim 14, wherein said magnetic recording apparatus uses a sector servo system, and said detection means and said count means are initialized for each sector.

16. The data storage device according to claim 11, wherein the read/write amplifier nominal transition time over which the output of said amplifier used during a read operation stabilizes, said predetermined time is equal or greater than the nominal transition time.

* * * * *